(12) United States Patent
Benner et al.

(10) Patent No.: US 9,497,226 B2
(45) Date of Patent: Nov. 15, 2016

(54) TRACKING THE PROGRESSION OF A COMMUNICATION SESSION

(71) Applicant: Avaya Inc., Basking Ridge, NJ (US)

(72) Inventors: Nic Benner, Northglenn, CO (US); Jean Meloche, Madison, NJ (US)

(73) Assignee: Avaya Inc., Santa Clara, CA (US)

(*) Notice: Subject to any disclaimer, the term of this patent is extended or adjusted under 35 U.S.C. 154(b) by 394 days.

(21) Appl. No.: 13/954,622

(22) Filed: Jul. 30, 2013

(65) Prior Publication Data

US 2015/0039775 A1 Feb. 5, 2015

(51) Int. Cl.
*G06F 15/173* (2006.01)
*H04L 29/06* (2006.01)
*H04L 29/08* (2006.01)

(52) U.S. Cl.
CPC ....... *H04L 65/1006* (2013.01); *H04L 65/1066* (2013.01); *H04L 67/146* (2013.01); *H04L 65/403* (2013.01)

(58) Field of Classification Search
None
See application file for complete search history.

(56) References Cited

U.S. PATENT DOCUMENTS

| 7,783,750 B1 | 8/2010 | Casey et al. |
| 2006/0153160 A1* | 7/2006 | Kalland et al. ............... 370/351 |
| 2009/0010271 A1* | 1/2009 | Bachmann et al. .......... 370/401 |
| 2009/0259758 A1* | 10/2009 | Chen et al. .................... 709/228 |
| 2010/0223446 A1 | 9/2010 | Katariya et al. |
| 2013/0212242 A1 | 8/2013 | Mendiratta et al. |

OTHER PUBLICATIONS

"Cisco Unified Real-time Montiroing Tool Administration Guide". Dec. 2010.*
Kaplan, H., "A Session Identifier for the Session Initiation Protocol (SIP) draft-kaplan-dispatch-session-id-03." http://tools.ietf.org/id/draft-kaplan-dispatch-session-id-03.txt. Mar. 14, 2011. 15 pgs.

* cited by examiner

*Primary Examiner* — Scott B Christensen
(74) *Attorney, Agent, or Firm* — Sheridan Ross P.C.

(57) ABSTRACT

A global identifier is generated based on the initiation of a communication session in a network. The global identifier is sent during the initiation of the communication session. For example, in a Session Initiation Protocol (SIP) INVITE, the global identifier is passed as the communication session progresses across the network. The communication session is logged based on the global identifier in a communication log. A map of the communication session is built from the session log based on the global identifier. The map includes all the elements that were involved with the communication session.

In another embodiment, the global identifier is used to for a communication session that is sent across multiple disparate networks. The global identifier is passed in-band during the establishment of the communication session across the disparate networks.

20 Claims, 6 Drawing Sheets

TRACKING THE PROGRESSION OF A COMMUNICATION SESSION

TECHNICAL FIELD

The systems and methods relate to network management systems and in particular to monitoring communication sessions.

BACKGROUND

In today's complex networks, tracking a communication session as the communication session progresses across a network is often difficult. If a problem is encountered during a communication session, it is often times difficult to identify different legs of the communication session using current network management systems. For example, if a communication session is transferred, a new communication session identifier is assigned to the transferred communication session. This causes problems in trying to track the progression of the communication session because the communication session now consists of two different session identifiers.

Many times, communication logs are only confined to specific parts of the communication session. As the communication session progresses across a network, only specific parts of the communication session are captured. These problems result in the inability to easily identify where problems in the communications network exist. What is needed is a comprehensive solution that can easily track the various aspects of a communication session across a network.

SUMMARY

Systems and methods are provided to solve these and other problems and disadvantages of the prior art. A global identifier is generated based on the initiation of a communication session in a network. The global identifier is sent during the initiation of the communication session. For example, in a Session Initiation Protocol (SIP) INVITE, the global identifier is passed as the communication session progresses across the network. The communication session is logged based on the global identifier in a communication log. A map of the communication session is built from the session log based on the global identifier. The map includes all the elements that were involved with the communication session.

In another embodiment, the global identifier is used to for a communication session that is sent across multiple disparate networks. The global identifier is passed in-band during the establishment of the communication session across the disparate networks.

DETAILED DESCRIPTION

Figure 1A:
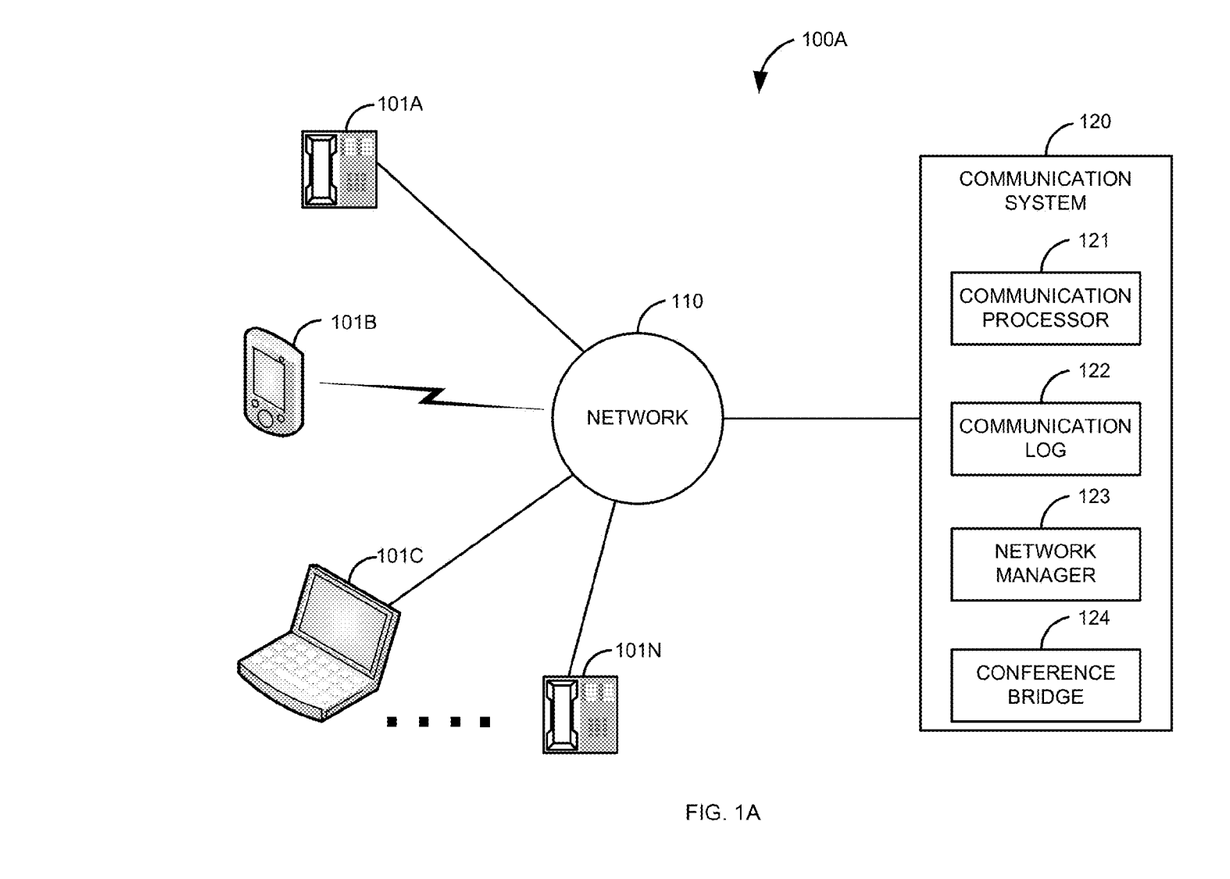
FIG. 1A is a block diagram of a first illustrative system for tracking the progression of a communication session.

FIG. 1A is a block diagram of a first illustrative system 100A for tracking the progression of a communication session. The first illustrative system 100A comprises communication devices 101A-101N, a network 110, and a communication system 120.

The communication device 101 may be any device that can communicate on the network 110, such as a Personal Computer (PC), a telephone, a video system, a cellular telephone, a Personal Digital Assistant (PDA), a tablet device, a notebook device, and the like. As shown in FIG. 1A, any number of communication devices 101A-101N may be connected to network 110, including only a single communication device 101. In addition, the communication device 101 may be directly connected to the communication system 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), H.323, Integrated Services Digital Network (ISDN), video protocols, and the like.

The communication system 120 can be any hardware/software that can process communication sessions, such as a network switch, a router, a gateway (i.e., the gateway 225 in FIG. 2), a Private Branch Exchange (PBX), a central office switch, a proxy server, a session manager, a communication manager, a video switch, and/or the like. The communication system 120 is shown as a single communication system 120. However, in other embodiments, the communication system 120 may be distributed across the network 110. The communication system 120 comprises a communication processor 121, a communication log 122, a network manager 123, and a conference bridge 124. The elements 121-124 of the communication system 120 are shown in the communication system 120. However, in other embodiments, different elements 121-124 of the communication system 120 can be distributed. For instance, the network manager 123 and/or the conference bridge 124 may reside external to the communication system 120.

The communication processor 121 can be any type of processor/processing system that can manage communications, such as a Digital Signaling Processor (DSP), a microprocessor, a Private Branch Exchange, a communication switch, a router, and/or the like. The communication processor 121 is used to provide switching and services for a communication session, such as providing proxy services, call routing, call forwarding, call transferring, and/or the like.

The communication log 122 is a log of the communication sessions/communication messages that have been handled by the communication system 120. The communication log 122 may be a compilation of communication logs 122 that are gathered from components within the network 110 (e.g., a network sniffer and/or other communication systems 120) and/or from the communication devices 101A-

101N. The communication log 122 can be a log of a specific communication session or multiple communication sessions. The communication log 122 may be part of a database, a packet log, and/or the like.

The network manager 123 can be any hardware/software that can be used to manage communications on the network 110. For example, the network manager can be a network management system, a Simple Network Management Protocol (SNMP) system, a network sniffer, a combination of these, and the like.

The conference bridge 124 can be any hardware/software that can bridge communications, such as a voice conference bridge, a video conference bridge, an Instant Messaging System (IM), and/or the like. The conference bridge can bridge different types of communications, such as voice communications, video communications, and text communications.

A user at the communication device 101A initiates a communication session to the communication device 101B. A communication session can be a voice communication session, a video communication session, a text communication session, and the like. For example, the user of the communication device 101A wants to make a voice call to the user of communication device 101B. The communication device 101A generates a global identifier based on the initiation of the communication session. The communication device 101A sends the global identifier, during the imitation of the communication session, to the communication system 120. For instance, the communication device 101A generates a global identifier that is included in a Session Initiation Protocol (SIP) INVITE message that is sent to the communication system 120.

The communication system 120 passes the global identifier along as the communication session progresses across the network 110. For example, when the communication system 120 receives the SIP INVITE, (i.e., if the communication system 120 is acting like a SIP proxy server), the communication system 120 will pass the SIP INVITE with the global identifier to the communication device 101B. In this example, there is only one communication system 120 that is involved in the communication session. However, in other embodiments, there may be multiple communication systems 120 that pass the global identifier.

The communication system 120 logs the communication session based on the global identifier in the communication log 122. For example, the communication system 120 can log the communication session by logging that a SIP INVITE was received from communication device 101A that included the global identifier; the log can also indicate that the SIP INVITE was sent to the communication device 101B. The network manager 123 builds a map of the communication session based on the global identifier. For instance, the network manager 123 builds a map that shows the communication session between the communication device 101A, the communication system 120, and the communication device 101B.

To illustrate the above process, consider the following example. Assume that in the above example that a voice communication was established and then ends by a user at communication device 101B terminating the voice communication session. After the initial SIP INVITE is sent, a 200 OK, SIP RINGING, SIP ACKs, and SIP BYE messages are sent between the communication devices 101A and 101B and the communication system 120. In this example, all the messages contain the global identifier. The communication system 120 logs each of the messages (including the global identifier in each). The network manager 123 can then build a map of the communication session by searching through the communication log 122 for the global identifier. In addition, the map can show a packet trace of each of the messages that includes the source and destination devices.

In the above examples, the global identifier is generated in the communication device 101 that initiates the communication session. However, in another embodiment, the communication device 101A may not support the generation of the global identifier. In this embodiment, the first communication device to receive a message that indicates the initiation of a communication session will generate the global identifier and will add the global identifier to the initiation message. For example, if the communication system 120 received a SIP INVITE that does not include the global identifier, the communication system 120 can add the global identifier to the SIP INVITE.

The above process will also work where the communication session is transferred or forwarded. For example, suppose that a voice call is established between the communication device 101A and the communication device 101B. The user at the communication device 101B decides to transfer the voice call from the communication device 101A to the communication device 101N. When the voice communication is transferred, a new communication session is created between the communication device 101A and the communication device 101N. The global identifier is also passed as part of the transferred communication session. This is different from existing systems, such as SIP systems, because SIP creates a new session identifier for the transferred communication session. The global identifier can coexist with the current SIP session identifiers or be used in place of the current SIP session identifiers.

The communication system 120 logs both the initial voice call and the transferred voice call using the same global identifier. The network manager 123 can build a map of the communication session that shows each of the devices (communication devices 101A, 101B, and 101N, and the communication system 120). Similarly, when a call is forwarded, the forwarded call will also have the global identifier.

The above process will also work where applications monitor the communication session. For example, many SIP systems use Back-to-Back User Agents (B2BUA). When a message is received by the communication system 120 and is then sent to a B2BUA, the communication system 120 will log that the message was sent to the B2BUA. If the above example included a B2BUA, the map would show the progress of the call from the communication device 101A, to the communication system 120, then to the B2BUA, then back to the communication system 120, and then to the communication device 101B. If multiple B2BUAs are used, all the B2BUAs would show up in the map. In some embodiments, the B2BUAs may keep a separate communication log 122.

This process will also work for conference calls. For example, assume that a communication session has been setup between the communication devices 101A and 101B. This first communication session has a first global identifier. During this time, the user at the communication device 101A receives a second call from a user at the communication device 101C. The user at communication device 101A puts the call to the communication device 101B on hold. The second communication session from the communication device 101C to the communication device 101A has a second global identifier that was generate by the communication device 101C upon the initiation of the second communication session. Each of the calls is logged in the communication log 122.

The user at communication device 101A wants to establish a conference call between communication devices 101A, 101B, and 101C via the conference bridge 124 (or via the communication device 101B of the communication device 101B supports conferencing). When the two calls are joined (conferenced), the global identifier of each call is stored in the joined conference call. The network manager 123 can build a composite map of the two communication sessions that are now joined.

The network manager 123 searches the communication log 122 based on either the first or the second global identifier. For example, if the communication manager searches the communication log for the first global identifier, the network manager 123 can determine that the first communication session was joined with the second communication session. The network manager 123 can now use the second global identifier to generate the composite map of the two communication sessions that formed the conference. This map can then be displayed to a user.

In another embodiment, the network manager 123 can change the communication log so that the packets of second communication session also have the first global identifier. This way all the packets of the two communication sessions have the same global identifier.

In another embodiment, a test communication session can be initiated. For example, the communication device 101A can receive a message from the network manager 123 to send a test SIP INVITE to establish a test communication session with the communication device 101B. After the test communication session has been setup and logged, the map of the communication session can be compared to an expected template (map). If the map of the test communication session does not match the expected template, the system can alert an administrator of the problem. For example, if the map does not show the communication session going through a specific B2BUA and the template expects that the B2BUA is part of the communication session, the network manager 123 can alert an administrator of the problem.

In the above examples, a single communication log 122 is used. However, in other embodiments, communication logs 122 of different communication systems 120, logs in the communication devices 101A-101N, logs of network sniffers, and/or logs of other devices such as a gateway can be used to generate the map using the global identifier. The network manager 123 can query these devices to create a global log of the communication process.

The above examples use SIP as an example; however in other embodiments, Web Real Time Communication (WebRTC), H.323, video protocols, text protocols, or other types of communication protocols may be used.

Figure 1B:
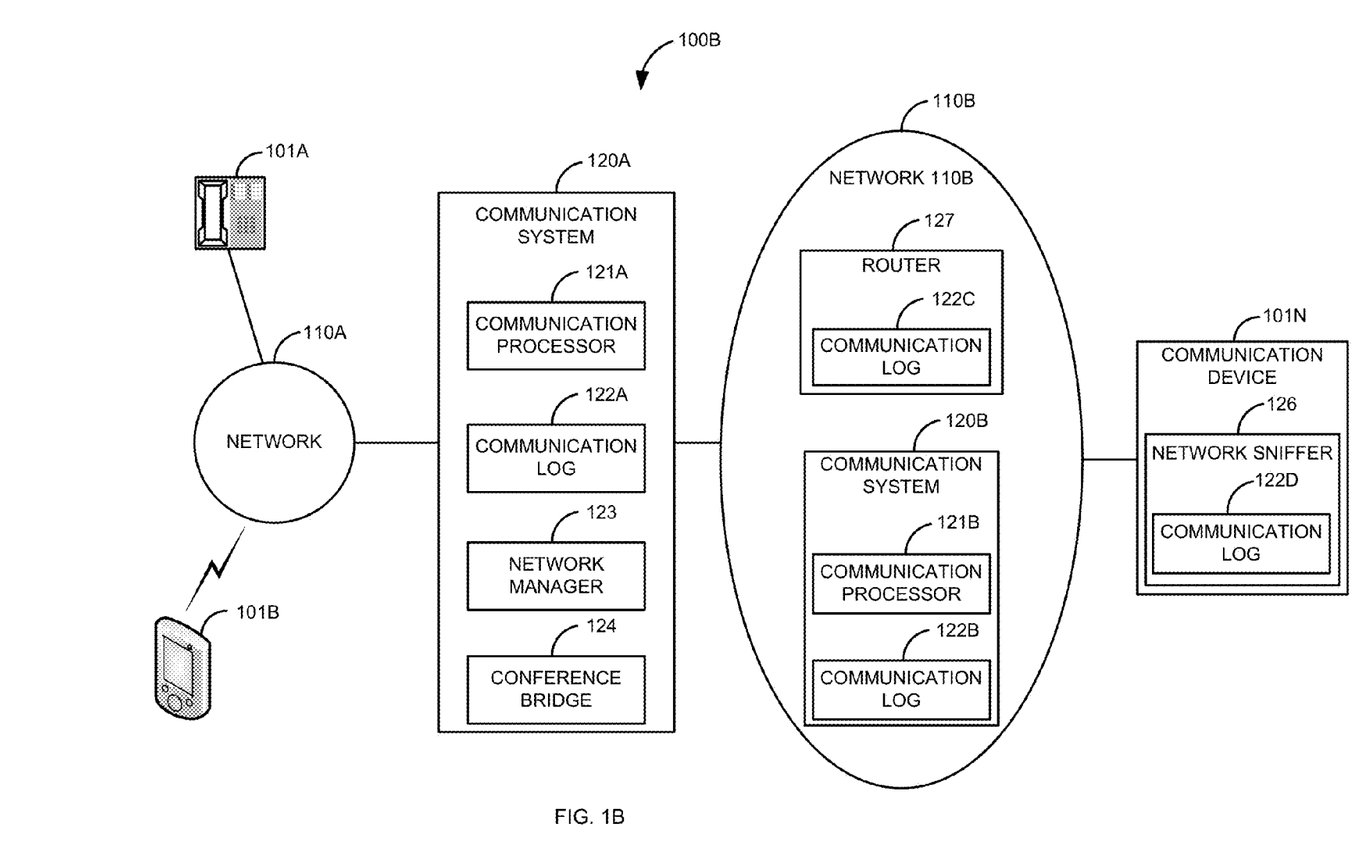
FIG. 1B is a block diagram of a second illustrative system for tracking the progression of a communication across multiple networks.

FIG. 1B is a block diagram of a second illustrative system 100B for tracking the progression of a communication across multiple networks. The second illustrative system 101B comprises communication devices 101A-101N, networks 110A-110B, and the communication system 120A.

The communication system 120A comprises a communication processor 121A, a communication log 122A, the network manager 123, and the conference bridge 124. The network 110B comprises a router 127 and a communication system 120B.

The router 127 can be any device that can route packets in the network 110B. The router 127 can route packets using various protocols, such as the Internet Protocol, Transport Communication Protocol (TCP), User Datagram Protocol (UDP), Session Initiation Protocol (SIP), H.323, video protocols, text protocols, and/or the like. The router 127 further comprises a communication log 122C. The communication log 122C is used by the router 127 for logging packets that are routed by router 127.

The communication system 120B comprises a communication processor 121B and a communication log 122B. The communication device 101N comprises a network sniffer 126. The network sniffer 126 can be any device that can capture packets sent to and from the communication device 101N. The network sniffer 126 captures any sent/received packets to the communication log 122D.

A user of the communication device 101B makes a call to a user of communication device 101N. The communication device 101B generates the global identifier based on the initiation of the communication session. The communication device 101B sends the global identifier based on the initiation of the communication session as discussed above.

As the communication session progresses across the networks 110A and 110B, the communication system 120A, the router 127, the communication system 120B, and the communication device 101N, using the global identifier, each element (120A, 120B, 127, and 101N) logs any sent/received packets with the global identifier in the respective communication logs 122A-122D.

The network manager 123 can then gather the communication logs 122A-122D. The logs can be gathered in various ways, such as using File Transfer Protocol (FTP), Secure File Transfer Protocol (SFTP), Simple Mail Transfer Protocol (SMTP), and/or the like. The network manager 123 could gather the logs by sending a message all devices on the network to send only a portion of the logs were the global identifier was involved.

The network manager 123 can then build a map of the communication session. For example, the map may look similar to FIG. 1B (a network diagram) that shows each element (101A, 120A, 127, 120B, and 101N). Alternatively, the map may be presented as a ladder diagram (e.g., like shown in FIGS. 3-5).

The logs may be in the same format or in different formats. If the logs are in different formats, the network manager 123 can translate the logs to be in the same format. The logs may be in a human readable format or be processed by a tool to make them human readable. The logs can be used to verify and validate configuration between the components of the system 100B. The network monitor 123 can translate between different versions of logs.

In one embodiment, where a ladder diagram is used, the system can show the packets that were sent between the different elements in the communication session. The map could show where errors occurred. For example, if a packet was dropped at router 127, the map could highlight the router in red. The user could click on the displayed router in the map to get information about the dropped packet. In a ladder diagram, it would show the packet going into the router, but not leaving the router. The line the router in the ladder diagram could be shown in red to indicate the error of the dropped packet.

The network monitor 123 can then parse each of the logs for errors, appropriate responses, inappropriate responses, gaps in interactions (i.e., a failure of a device to respond at the appropriate time), and the like. This information can all be reported in the map that is generated.

If an element of the network 110 does not store logs, the generated map may still be able to show the element that does not store logs. For example, there was a second router 127B in network 110B (between the router 127 and the communication device 101N) that did not support the use of the communication log 122, the map would show packets going to the router 127B and being sent to the communication device 101N (based on communication device 101N receiving the packet from the router 127B.

The above systems can use different protocols. For example, the network 110A can use one protocol (e.g., SIP) and the network 110B can use another protocol (H.323). The network manager can get the logs that are based on the disparate protocols using the global identifier to produce the map of the communication session.

To illustrate, consider the following example. If a customer using communication device 101N was on a call that was dropped. The customer can call in and identify the time the call was dropped (or get the global identifier by bringing up a menu on the phone to get the global identifier). Based on the time/device a technician could gather logs from the communication device 101N. Based on the time, the technician can determine the global identifier for the communication session. The network manager 123 could then gather all the logs 122A-122D and then build a map of the communication session using the global identifier. Based in the map, the technician could easily identify where the user was dropped from the communication session because the flow of the packets is shown to the technician (e.g., using a ladder diagram).

Figure 2:
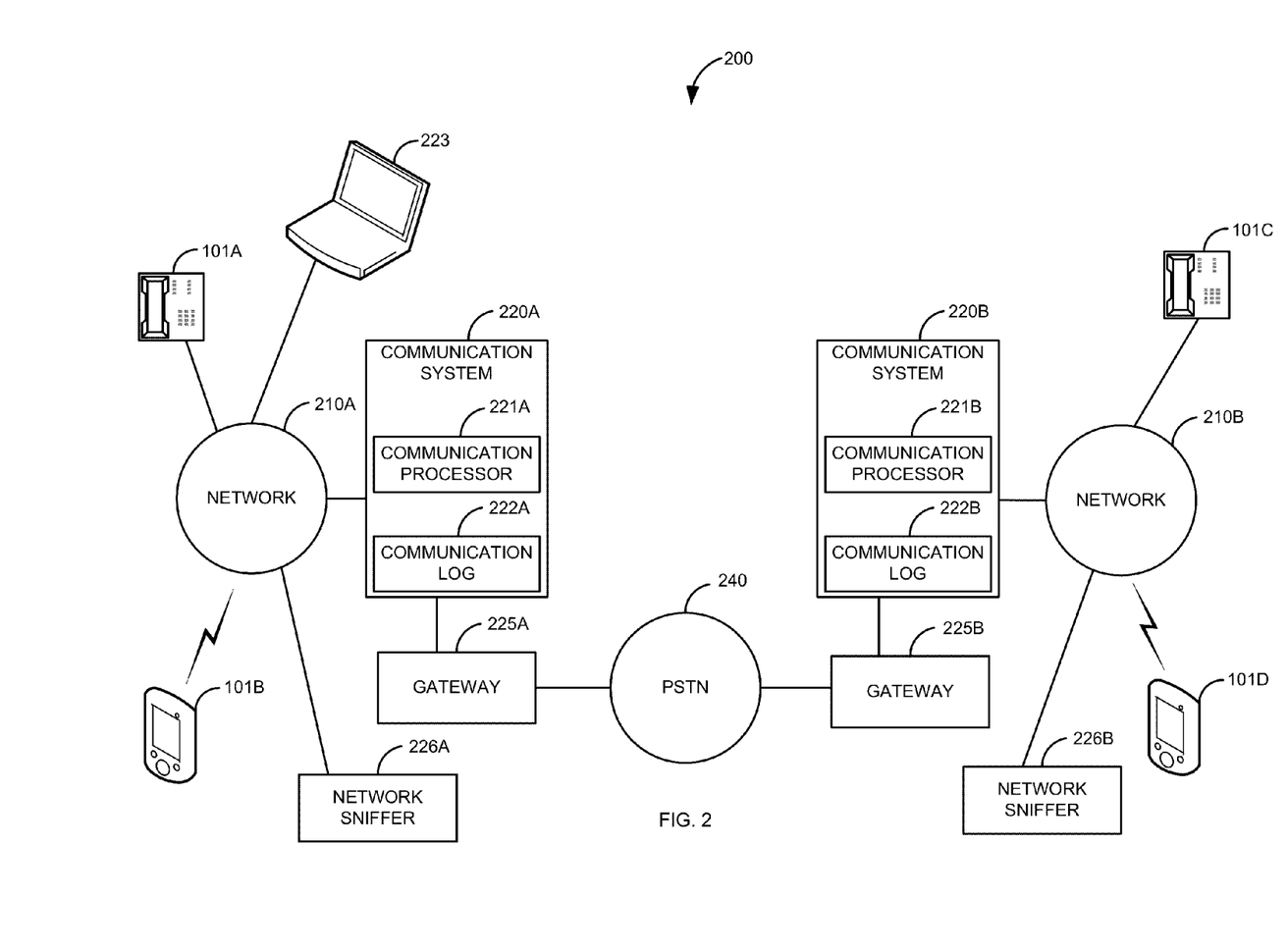
FIG. 2 is a block diagram of a third illustrative system for tracking the progression of a communication session across multiple disparate networks.

FIG. 2 is a block diagram of a third illustrative system 200 for tracking the progression of a communication session across multiple disparate networks. The third illustrative system 200 comprises the communication devices 101A-101D, networks 210A-210B, communication systems 220A-220B, gateways 225A-225B, network sniffers 226A-226B, a Public Switched Telephone Network (PSTN) 240, and a network manager 223.

The networks 210A-210B can be any type of network, including the network 110. The communication systems 220A-220B can be any type of communication system, including the communication system 120. The gateways 225A-225B can be any type of device that converts one protocol to another. For example, the gateways 225A-225B may convert SIP or H.323 calls on the networks 210A-210B to analog calls via the PSTN 240.

The PSTN can be any public switched telephone network, such as an analog network, a circuit switched network, a packet switched network, a SIP network, a cellular network, and/or the like. The network sniffers 226A-226B and be any device that can monitor packets on the network 210. For example, the network sniffers can be a network analyzer. The network sniffers 225A-225B are shown as separate entities on the networks 210A-210B. However, in other embodiments, the network sniffers 225A-225B may be embedded into the communication devices 101A-101D, the communication systems 220A-220B, and/or the gateways 225A-225B. The network manager 223 can be any type of network manager 223, including the network manger 123.

The communication systems 220A-220B further comprise the communication processors 221A-221B and the communication logs 222A-222B. The communication processors 221A-221B can be any type of communication processor, including the communication processor 121. The communication logs 222A-22B can be any type of communication log, including the communication log 122.

The communication device 101A initiates a communication session to the communication device 101C. The communication device 101A generates a global identifier. The communication device 101A sends the message with the global identifier to the communication system 220A. For example, the communication device 101A generates a SIP INVITE with the global identifier that is sent to the communication system 220A. The communication system 220A logs the message with the global identifier (e.g., the SIP INVITE) in the communication log 222A.

The communication system 220A determines that the SIP INVITE is for the communication device 101C on the network 210B. The communication system 220 directs the SIP INVITE to the gateway 225A. The gateway 225A converts the SIP call to an analog call across the PSTN 240. In one embodiment, the gateway 225A also has a communication log 222. The PSTN 240 directs the analog call to the gateway 225B. The gateway 225B converts the analog call to a SIP call (and the gateway 225B can also log the call). A communication session is established between the communication system 220A and the communication system 220B via the PSTN 240.

The communication system 220A/gateway 225A passes the global identifier across the PSTN (e.g., via Dual Tone Multi-Frequency (DTMF) tones in-band). The communication system 220B completes the establishment of the communication session using the global identifier (e.g., by sending a second SIP INVITE to the communication device 101C with the global identifier). The communication system 220B logs the communication message with the global identifier on the network 210 in the communication log 222B. The communication session is setup from the communication device 101A via a SIP call from the communication device 101A to the communication system 220A/gateway 225A, an analog call via the PSTN via the gateways 225A-225B, and a SIP call via the communication system 220B/gateway 225B and the communication device 101C.

The network manager 223 can then create a map of the communication session by getting the information in the communication logs 222A-222B (and logs of the gateways 225A/225B). This could be done via the Internet (not shown) or some other method. The network manager 223 can show the map of the communication session that includes the communication device 101A, the communication system 220A, the gateway 225A, the gateway 225B, the communication system 220B, and the communication device 101C.

In another embodiment, the communication device 101A initiates a communication session to the communication device 101C. The communication device 101A generates a first global identifier. The communication device 101A sends the message with the first global identifier to the communication system 220A. For example, the communication device 101A generates a SIP INVITE (or WebRTC message) with the first global identifier that is sent to communication system 220A. The communication system 220A logs the message with the first global identifier (e.g., the SIP INVITE) in the communication log 222A.

The communication system 220A determines that the SIP INVITE is for the communication device 101C on the network 210B. The communication system 220 directs the SIP INVITE to the gateway 225A. The gateway 225A converts the SIP call to an analog call across the PSTN 240. The PSTN 240 directs the analog call to the gateway 225B. The gateway 225B converts the analog call to a SIP call. The gateway 225B generates a second global identifier that is included in a second SIP INVITE that is used to establish a SIP call between the gateway 225B and the communication device 101C. A communication session is established between the communication device 101A and the communication device 101C via the PSTN 240 in the same manner as discussed above (except that there are two global identifiers used for each of the two networks 210A and 210B).

The network manager 223 can determine that the two global identifiers are linked based on a telephone number used to make the call. For example, the telephone number of communication device 101A, 101C, and/or both. The network manager 223 gets the two communication logs 222A-222B. The network manager 223 determines based on the called number and/or calling number of the communication device 101A/101C that the two global identifiers are part of the same call. In addition, or alternatively, the network manager 223 can use a time stamp of when the call was made to determine that the two legs of the call are linked together. The network manager 223 can then build the network map with this information.

In the above examples, the communications sessions on the two networks both are describes as using SIP. However, in other embodiments, the protocols used in the network 210A and the network 210B can be different. For example, the network 210A may use SIP while the network 210B could use H.323.

In another embodiment, the network sniffers 226A-226B can be used to capture packet traces that are used to create a communication log 222 (not shown) that is stored in the network sniffer 226A-226B. The communication logs 222 that are generated by the network sniffers 226A-226B can be combined with the communication logs 222A-222B to create a more complete communication log 222 for the communication session. The communication logs in the network sniffers 226A-226B can provide a more complete map of the communication session in instances where some elements of the communication process does not generate a communication log 222.

Figure 3:
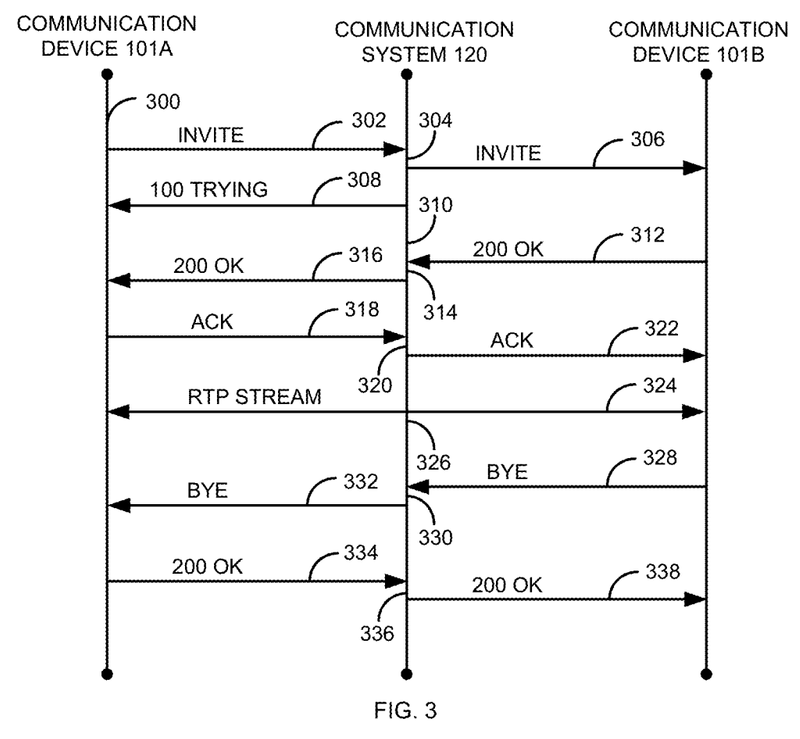
FIG. 3 is a flow diagram of a method for tracking the progression of a communication session.
Figure 4:
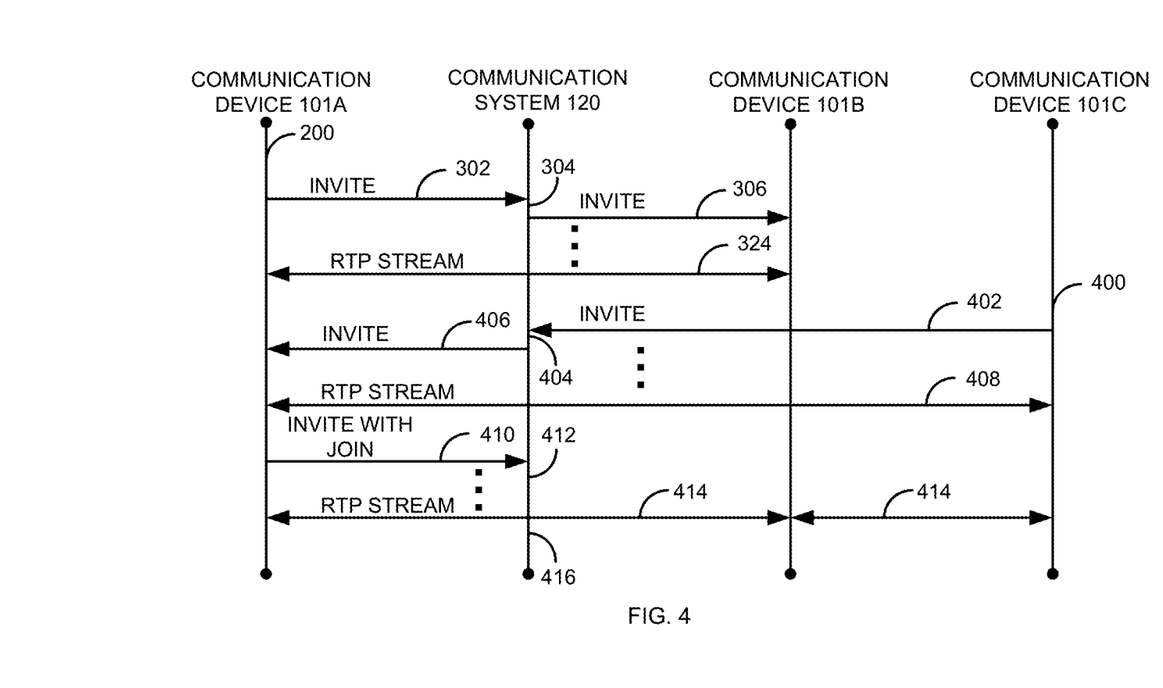
FIG. 4 is a flow diagram for tracking the progression of a conferenced communication session.
Figure 5:
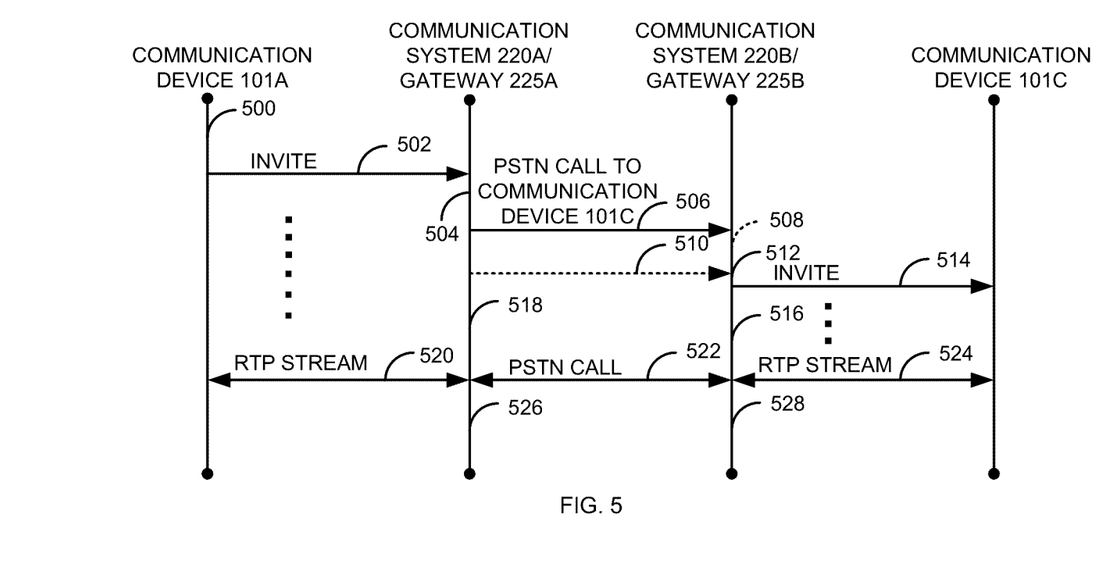
FIG. 5 is a flow diagram for tracking the progression of a communication session across multiple disparate networks.

FIG. 3 is a flow diagram of a method for tracking the progression of a communication session. Illustratively, the communication devices 101A-101N, the communication systems 120/220, the communication processors 121/221, the network managers 123/223, the conference bridge 124, the gateways 225, and the network sniffers 226 are stored-program-controlled entities, such as a computer or processor, which performs the method of FIGS. 3-5 and the processes described herein by executing program instructions stored in a tangible computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process described in FIG. 3 is based on SIP. However, other protocols may be used, such as H.323, WebRTC, video protocols, and/or the like.

The communication device 101A generates 300 a global identifier. The communication device 101A sends 302 a SIP INVITE with the global identifier to the communication system 120. The communication system 120 logs 304 the SIP INVITE with the global identifier in the communication log 122. The communication system 120 passes 306 the global identifier in the SIP INVITE to the communication device 101B. The communication system 120 sends 308 a SIP TRYING message with the global identifier to the communication device 101A. The communication system 120 logs 310 the SIP TRYING message with the global identifier in the communication log 122.

The communication device 101B sends 312 a 200 OK message with the global identifier to the communication system 120. The communication system 120 logs 314 the 200 OK message with the global identifier in the communication log 122. The communication system 120 passes 316 the 200 OK message with the global identifier to the communication device 101A. The communication device 101A sends 318 a SIP ACK message with the global identifier to the communication system 120. The communication system 120 logs 320 the SIP ACK message with the global identifier in the communication log 122. The communication system 120 passes 322 the SIP ACK message to the communication device 101B.

A Real Time Protocol (RTP) stream is established 324 between the communication device 101A and the communication device 101B. The RTP stream uses the global identifier. The packets of the RTP stream are logged 326 by the communication system 120 in the communication log 122. The communication device 101B ends the communication session by sending 328 a SIP BYE message with the global identifier to communication system 120. The communication system 120 logs 330 the SIP BYE message with the global identifier in the communication log 122. The communication system 120 passes 332 the SIP BYE message with the global identifier to the communication device 101A. The communication device 101A responds by sending 334 a 200 OK message with the global identifier to the communication system 120. The communication system 120 logs 336 the 200 OK message with the global identifier in the communication log 122. The communication system 120 passes 338 the 200 OK message with the global identifier to the communication device 101B to complete the tear down of the communication session.

At this point, the network manager 123 can build the map of the communication session using the information in the communication log 122. The map includes which communication devices 101A and 101B, and which communication system 120 was involved in the communication session. The map can also include each of the packets that were sent. For example, using a ladder diagram as shown in FIG. 3.

The above process assumes that the communication system 120 is a centralized communication system (e.g., Avaya's Communication Manger™) where all the packets of the communication session go through the communication system 120. However, in other embodiments, where the communication system 120 is a non-centralized communication system (e.g., Avaya's Session Manager™), that is only used to setup the initial SIP call to the communication device 101B, the communication devices 101A and 101B may further comprise the network sniffer 226. The network sniffers 226 in the communication devices 101A and 101B are used to log the different SIP messages (e.g., the SIP 200 OK messages, the SIP RTP Stream messages, and the like). The communication log 122 along with the communication logs in the communication devices 101A-101B can be used to build the map of the communication session. Alternatively, only the communication logs in the communication devices 101A and 101B can be used to build the map of the communication session.

FIG. 4 is a flow diagram for tracking the progression of a conferenced communication session. As described in FIG. 3, the communication device 101A generates 300 a first global identifier. The communication device 101A sends 302 a SIP INVITE with the global identifier to the communication system 120. The communication system 120 logs 304 the SIP INVITE with the first global identifier in the communication log 122. The communication system 120 passes 306 the first global identifier in the SIP INVITE to the communication device 101B. Following the process of FIG. 3, an RTP stream is setup 324 between communication devices 101A and 101B. Each of the messages to setup the communication session are logged in the communication log 122 using the first global identifier.

The communication device 101C generates 400 a second global identifier. The communication device 101C sends 402 a SIP INVITE with the second global identifier to the communication system 120. The communication system 120 logs 404 the SIP INVITE with the second global identifier in the communication log 122. The communication system 120 passes 406 the global identifier in the SIP INVITE to the communication device 101A. Eventually, an RTP stream is setup between the communication devices 101C and 101A using a similar process as described in FIG. 3.

A user at the communication device 101A wants to join the two communication sessions into a single conference call. A SIP INVITE with a JOIN is sent 410 to the communication system 120. The SIP INVITE with the JOIN contains both the first and second global identifiers. The communication system 120 logs 412 the SIP INVITE with the JOIN message with the first and second global identifiers. Eventually an RTP stream is setup 414 between the communication devices 101A-101C. The communication system 120 logs 416 the packets of the RTP stream in the communication log 122 using the first and second global identifiers.

The network manager 123 builds a map of the conferenced communication session based on the first and second global identifiers. For example, if a user of the communication device 101C is experiencing problems in the conferenced communication session, the user can look up the second global identifier in the communication device 101C. An administrator can use the provided second global identifier to build a map of the communication session. The network manager 123 searches the communication log 123 for all messages that use the second global identifier to build a map of the communication session between communication device 101C and 101A. Based on the SIP INVITE with the JOIN, the network manager 123 can determine that the two communication sessions were joined into a conference call. The network manager 123 can use the first global identifier to build a composite map of the conference call. The composite map of the conferenced call shows the two initial communication sessions, the joining of the communication sessions, and all the devices involved in the two communication sessions.

FIG. 5 is a flow diagram for tracking the progression of a communication session across multiple disparate networks. The communication device 101A generates 500 a first global identifier. The communication device 101A sends 502 a SIP INVITE to communication system 220A/gateway 225A. The communication system 220A logs 504 the SIP INVITE containing the first global identifier in the communication log 222A. The gateway 225A makes a call 506 via the PSTN 240 to the gateway 225B.

In one embodiment, the communication system 220B or gateway 225B generates 508 a second global identifier. Alternatively, the communication system 220A can send 510 the first global identifier via the call to the PSTN 240 (the PSTN call 522). In one embodiment, the communication system 220A can send the first global identifier in-band using Dual Tone Multi-Frequency (DTMF) tones. Alternatively, if the PSTN call is a SIP call across the PSTN 240, the call via the PSTN is initiated with a SIP INVITE that contains the first global identifier in a SIP header.

Sending the DTMF tones may work in various ways. For instance, if the global identifier was a long hexadecimal number, the message can be sent using a * tone to indicate the start of the sequence in decimal and then use a # tone to represent the end of the global identifier. The decimal number could then be converted back to a hexadecimal number.

The communication system 220B/gateway 225B logs 512 the call over the PSTN 240. The communication system 220B sends 514 a SIP INVITE with the first global identifier (if the first global identifier was sent across the PSTN) or the second global identifier (if the second global identifier was generated by the communication system 220B and/or gateway 225B) to the communication device 101C. Eventually, a SIP communication session is setup between the communication device 101C and the communication system 220B using either the first or the second global identifier. The communication system 220B logs 516 each of the messages that are necessary to setup the communication session between the communication device 101C and the communication system 220B containing the first or second global identifier.

As described above, a call is setup 522 via the PSTN between the communication system 220B and the communication system 220A. Likewise, a SIP communication session is eventually setup between the communication device 101A and the communication system 220A. The messages necessary to setup the SIP communication session between the communication device 101A and the communication system 220A is logged 518 in the communication log 222A. At this point, there is a communication channel from the communication device 101A to 101C as indicated by the three communication channels 520, 522, and 524. The communication system 220A logs 526 the messages for the RTP stream 520 in the communication log 222A. The communication system 220B logs 528 the messages for the RTP stream 524 in the communication log 222B.

The network monitor 223 gets the communication logs 222A and 222B. The network monitor 223 then generates a map of the communication session between the communication devices 101A and 101C. If the first global identifier was passed from the communication system 220A to the communication system 220B, the network monitor 223 can build the map of the communication session using only the first global identifier.

Alternatively, if the communication system 220B/gateway 225B generated the second global identifier in step 508, the network monitor 223 will build the map of the communication session using the first and second global identifiers. The network monitor 223 can link the two communication sessions with the first and second global identifiers based on a telephone number/address used in the PSTN call and/or based on a time stamp.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, by a microprocessor, a first global identifier that was generated based on an initiation of a first communication session in a first network, wherein the first global identifier is received during the initiation of the first communication session, wherein the first communication session is a communication session that occurs between the first network and a second network that are connected by a Public Switched Telephone Network (PSTN), wherein the first network and the second network are Session Initiation Protocol (SIP) or Web Real Communications (WebRTC) based;

passing, by the microprocessor, the first global identifier as the first communication session progresses across the first network;

generating, by the microprocessor, a second global identifier based on an initiation of the first communication session to the second network, wherein the second global identifier is used for the first communication session in the second network and the first global identifier is used for the first communication session in the first network;

logging, by the microprocessor, the first communication session based on the first global identifier and the second global identifier in a communication log; and building, by the microprocessor, a map of the first communication session based on the first global identifier and the second global identifier by searching through the communication log for the first global identifier and the second global identifier, wherein the map of the first communication session is used for testing purposes.

2. The method of claim 1, wherein the first network comprises a plurality of networks, wherein the first communication session in the first network comprises a Session Initiation Protocol (SIP) communication session and wherein passing the first global identifier as the first communication session progresses across the plurality of networks comprises passing the first global identifier across the PSTN that is not SIP based.

3. The method of claim 2, wherein the first global identifier is passed in-band across the PSTN using Dual-Tone Multi-Frequency (DTMF.

4. The method of claim 1, wherein building the map of the first communication session further comprises building the map of the first communication session based on a telephone number of a communication device on the second network that was a part of the first communication session or a time stamp of the initiation of the first communication session to the second network.

5. The method of claim 1, wherein the map of the first communication session is based on a plurality of log files gathered from a plurality of devices, wherein the map of the first communication system is displayed to a user as a network diagram or a ladder diagram and wherein the network diagram or the ladder diagram identifies one of an error, an appropriate response, an inappropriate response, or a gap in an interaction.

6. A system comprising:
a microprocessor; and
a computer readable medium, coupled with the microprocessor and comprising microprocessor readable and executable instructions that cause the microprocessor to execute:
a first communication system that receives a first global identifier that is based on an initiation of a first communication session in a first network, wherein the first global identifier is received during the initiation of the first communication session, passes the first global identifier as the first communication session progresses across the first network, and logs the first communication session based on the first global identifier in a communication log, receives a second global identifier that is based on an initiation of a second communication session on the first network, wherein the second global identifier is received during the initiation of the second communication session, wherein the first global identifier and the second global identifier are different, passes the second global identifier as the second communication session progresses across the first network, and logs the second communication session based on the second global identifier in the communication log, wherein the progression of the second communication session comprises conferencing the second communication session with the first communication session; and
a network manager that builds a composite map of the first communication session based on the first global identifier and the second global identifier by searching through the communication log for the first global identifier and the second global identifier, and generates for display, the composite map of the first communication session and the second communication session, wherein the composite map is used for testing purposes.

7. The system of claim 6, wherein the first communication session in the first network comprises a Session Initiation Protocol (SIP) communication session.

8. The system of claim 6, wherein the composite map is based on a plurality of log files gathered from a plurality of devices, wherein the composite map is displayed to a user as a network diagram or a ladder diagram and wherein the network diagram or the ladder diagram identifies one of an error, an appropriate response, an inappropriate response, or a gap in an interaction.

9. The system of claim 6, wherein passing the first global identifier as the first communication session progresses across the first network comprises passing the first global identifier when the first communication session is transferred.

10. The system of claim 6, wherein building the composite map is based on a stored log of a communication system and based on a log of a network sniffer.

11. The system of claim 6, wherein the first communication session is a Session Initiation Protocol (SIP) communication session or a Web Real-Time Communication (WebRTC) communication session.

12. The system of claim 6 wherein the communication log is a communication log in a plurality of communication devices.

13. The system of claim 6, wherein initiating the first communication session is based on sending a test SIP INVITE and wherein the composite map is compared to an expected template.

14. A method comprising:
receiving, by a microprocessor, a first global identifier that was generated based on an initiation of a first communication session in a first network, wherein the first global identifier is received during the initiation of the first communication session;
passing, by the microprocessor, the first global identifier as the first communication session progresses across the first network;
logging, by the microprocessor, the first communication session based on the first global identifier in a communication log;
receiving, by the microprocessor, a second global identifier based on an initiation of a second communication session in the first network, wherein the first global identifier and the second global identifier are different;

sending, by the microprocessor, the second global identifier during the initiation of the second communication session;

passing, by the microprocessor, the second global identifier as the second communication session progresses across the first network;

logging, by the microprocessor, the second communication session based on the second global identifier in the communication log, wherein the progression of the second communication session comprises conferencing the second communication session with the first communication session; and building, by the microprocessor, a composite map of the first communication session and the second communication session based on the first global identifier and the second global identifier by searching through the communication log for the first global identifier and the second global identifier, wherein the composite map is used for testing purposes.

15. The method of claim 14, wherein the composite map is based on a plurality of log files gathered from a plurality of devices, wherein the composite map is displayed to a user as a network diagram or a ladder diagram and wherein the network diagram or the ladder diagram identifies one of an error, an appropriate response, an inappropriate response, or a gap in an interaction.

16. The method of claim 14, wherein passing the first global identifier as the first communication session progresses across the first network comprises passing the first global identifier when the first communication session is transferred.

17. The method of claim 14, wherein building the composite map is based on a stored log of a communication system and based on a log of a network sniffer.

18. The method of claim 14, wherein the first communication session is a Session Initiation Protocol (SIP) communication session or a Web Real-Time Communication (WebRTC) communication session.

19. The method of claim 14, wherein the communication log is a communication log in a plurality of communication devices.

20. The method of claim 14, wherein initiating the first communication session is based on sending a test SIP INVITE and wherein the composite map is compared to an expected template.

* * * * *